(12) United States Patent
Naaman et al.

(10) Patent No.: US 7,495,815 B2
(45) Date of Patent: Feb. 24, 2009

(54) ELECTRO-OPTICAL MODULATOR

(75) Inventors: Ron Naaman, Rehovot (IL); Erez Halahmi, Bazra (IL); Gilad Diamant, Haifa (IL); Dmitry Shvarts, Kiryat Ono (IL); Leeor Kronik, Rehovot (IL); Nili Kloner-Gendel, Kfar Saba (IL)

(73) Assignee: Nova Trans Group S.A., Vaumarcus NE (CH)

( * ) Notice: Subject to any disclaimer, the term of this patent is extended or adjusted under 35 U.S.C. 154(b) by 180 days.

(21) Appl. No.: 11/337,800

(22) Filed: Jan. 24, 2006

(65) Prior Publication Data
US 2006/0181764 A1     Aug. 17, 2006

Related U.S. Application Data (60) Provisional application No. 60/645,754, filed on Jan. 24, 2005.

(51) Int. Cl.
*G02F 1/07*    (2006.01)
*G02F 1/29*    (2006.01)
*G02F 2/00*    (2006.01)

(52) U.S. Cl. ............ 359/245; 359/315; 359/237; 359/238; 359/244; 359/253; 359/298; 359/299; 359/325; 365/49; 365/45

(58) Field of Classification Search .......... 359/315, 359/253, 258, 317, 244, 245, 292, 294, 295, 359/237, 238, 325, 298, 299; 345/32, 84; 353/122; 365/45, 49, 215; 313/379, 380, 313/465, 524; 348/772, 196, 197, 359, 286, 348/760; 324/76.21, 76.36; 356/308, 319, 356/326, 521; 250/225, 226, 361 R, 369, 250/565
See application file for complete search history.

(56) References Cited

U.S. PATENT DOCUMENTS

| | | | | |
|---|---|---|---|---|
| 3,154,748 A | * | 10/1964 | Javan et al. | 359/325 |
| 3,295,912 A | * | 1/1967 | Fleisher et al. | 359/317 |
| 3,299,306 A | * | 1/1967 | Kapany | 313/524 |
| 3,625,594 A | * | 12/1971 | Lanza | 359/315 |
| 4,913,549 A | * | 4/1990 | Fujita et al. | 356/521 |
| 4,923,287 A | * | 5/1990 | Ooi et al. | 359/245 |
| 4,929,835 A | * | 5/1990 | Yamashita et al. | 250/367 |
| 4,930,853 A | | 6/1990 | Grego | |
| 4,972,348 A | * | 11/1990 | Ishikawa et al. | 365/49 |
| 5,208,696 A | * | 5/1993 | Kobayashi et al. | 359/245 |

* cited by examiner

*Primary Examiner*—Loha Ben
(74) *Attorney, Agent, or Firm*—Browdy and Neimark, P.L.L.C.

(57) ABSTRACT

An electro-optical modulator device and method are provided. The device comprises a light modulator unit having a first Cathode for exposing to input light; and an electric field source configured to create an electric field affecting a change in the refractive index of the first Cathode, thereby effecting a change in the propagation of light reflected from or transmitted through the first Cathode, said light from the first Cathode enabling to affect the operation of an external light sensitive electronic device.

36 Claims, 4 Drawing Sheets

FIG. 4B though a plate face. Said electrodes are parallel to one another, equally-spaced and separately connected to voltage sources apt to increase the refractive index in the material passing from an electrode to the next. The emerging optical beam is deflected in the direction wherein the refractive index increases.

ELECTRO-OPTICAL MODULATOR

FIELD OF THE INVENTION

This invention relates to an electro-optical modulator and method.

BACKGROUND OF THE INVENTION

It is known in the art to affect the trajectory of a light signal by affecting the refractive index of a medium of the signal propagation by an electric field. This is used in electro-optical deflectors and modulators.

For example, U.S. Pat. No. 4,930,853 discloses an electrooptic deflector composed of a plate made of a material with a refractive index which can be modified by the application of an electrical field, whereinto a collimated optical beam can be injected in direction parallel to the electrodes deposited on a plate face. Said electrodes are parallel to one another, equally-spaced and separately connected to voltage sources apt to increase the refractive index in the material passing from an electrode to the next. The emerging optical beam is deflected in the direction wherein the refractive index increases.

However, conventional electro-optical modulators typically require high operating voltages and have a high response time.

SUMMARY OF THE INVENTION

There is a need in the art to facilitate signal modulation and attenuation by providing a novel fast electro-optical modulator capable of operating with frequencies up to THz range, and allowing for fast interconnects in chips and electrical circuits.

The present invention provides an electro-optical modulator device comprising a light modulator unit having a first Cathode for exposing to input light; and an electric field source configured to create an electric field affecting a change in the refraction index of the first Cathode. The light modulator unit is associated with a light sensitive device (for example a second photocathode of an electronic device), arranged to be affected by the light output of the light modulator unit.

The electro-optical modulator device may or may not include in its constructional part an illumination source applying the input light to the first Cathode (e.g. illuminator producing the input light). The illumination source may include a light source, or may be constituted by an optical fiber (e.g., transmitting the input light indicative of a signal coming from a communication network) or by an optical window made in a substrate carrying the Cathode.

It should be noted that the term "electronic device" used herein refers to a device including at least one multiple electrode unit such as a diode or triode (e.g., transistor).

In some embodiments of the invention, the light modulator unit may be configured as the electronic device, namely as a diode or triode. Alternatively, the light modulator unit may be formed by a Photocathode only, as will be described below.

The light output of the light modulator unit is light returned from the first Cathode, namely light reflected from or transmitted through the first Cathode. Thus, according to one embodiment of the invention, the first Cathode and the second Photocathode (constituting a light sensitive device) are arranged so that light reflected from the first Cathode can be incident onto the second Photocathode. According to another embodiment of the invention, the arrangement is such that light transmitted through the first Cathode can reach the second Photocathode.

The light output of the light modulator unit when reaching the second Photocathode causes electrons' extraction from the second Photocathode to thereby affect an electric current between the second Photocathode and its associated (second) Anode of the electronic device. Hence, the electric current through the electronic device depends on the light output of the light modulator unit.

As indicated above, the light modulator unit operates to effect a change in the refractive index of the first Cathode by generation of an electric field, to thereby cause a change in the propagation of a light beam reflected from or transmitted through the first Cathode. The electric field affecting the refractive index of the first Cathode is created as a potential difference between two opposite surfaces of the first Cathode, as a result of an existing electric current through the light modulator unit. Hence, the electric field source is a source of electric current from the first Cathode.

The first Cathode may be configured as a Photocathode. In this case, the electric current through the light modulator unit is a current of electrons which are ejected from the first Photocathode. The potential difference between the opposite surfaces of the Photocathode, and accordingly the electric field, may be changed by varying the voltage of an Anode or Gate of the light modulator unit and thus varying the electric current through the light modulator unit. According to another example of the invention, the potential difference between the opposite surfaces of the Photocathode, and accordingly the electric field, is changed by varying the intensity or wavelength of the input light, in which case the light modulator unit may contain only the Photocathode without a need for an Anode or a Gate (as the ejection of electrons itself creates the electrical field). According to yet another example, the same effect can achieved without any electric current at all, when a change in the Anode or Gate voltage changes the potential induced on the Photocathode.

The first Cathode may not be a Photocathode, but a "simple" Cathode, in which case the Anode of the light modulator unit (which may be an Anode of another electronic device, with which the device of the present invention is associated) is at a tunneling distance from the first Cathode. Hence, in the case of a tunneling Cathode, the electric current from the Cathode to the Anode causes the generation of the electric field between the two surfaces of the Cathode.

The change in the potential difference between opposite surfaces of the first Photocathode may be effected by changing the voltage supply to the Anode or to the Gate of the light modulator unit; or by varying the intensity or wavelength of the input light.

In the case of a "simple" first Cathode, the capacitance of the light modulator unit is higher than in the case of a first Photocathode (since the Anode is much closer to the Cathode) which results in lower operation frequencies of the device.

As indicated above, the electronic device including the second Photocathode may be configured to define one or more diode/triode structures. Hence, the second Photocathode may be a continuous electrode or may be an array of electrode-elements each associated with its respective Anode element.

It should be understood that the Anode of the electronic device which is associated with the first Cathode may be an electrode of another diode/triode structure with which the electro-optical modulator device of the present invention is associated. Thus, an electric signal on the Anode creating an electric field affecting the refractive index of the first Cathode is the output signal of said electronic device.

The electro-optical modulator device may be installed as a part of an electronic system for connecting various electronic devices to one another, thus carrying out signal switching or attenuation functions. By appropriately deflecting (i.e., reflecting or transmitting) light from the first Cathode (e.g., depending on the output of the external electronic device), the operation of the light sensitive device (e.g. Photocathode or optocoupler) can be controlled, thus controlling the operation of another external electronic devices.

The present invention provides for very fast signal switching; as compared to purely electronic switching. The present invention also advantageously provides for using the same light modulator unit (first Cathode (Photocathode or not) being a part of an electronic device) with multiple electronic devices each including its associated second Photocathode. Connection to gateless electronic devices can be used to decrease the capacitance of the device thus increasing its operation frequency. Illumination of several devices in parallel can produce a high power switching device at very high frequency.

Additionally, the technique of the present invention can be used in optical communications, for transferring information within a computer (bus) or "on board" interconnect. This solves the problem of slow metal interconnects or optical interconnects that cannot exceed 5 GHz. The present invention, being a light modulator, can also be used as a deflector for a flat panel display replacing the Liquid-Crystal in LCDs.

Thus, according to one broad aspect of the present invention, there is provided an electro-optical modulator device comprising: a first Cathode for exposing to input light; and an electric field source configured and operable to create a potential difference between two opposite surfaces of the first Cathode to thereby enable to cause a change in the refractive index of the first Cathode by varying the electric field and accordingly cause a change in the propagation of a light beam reflected from or transmitted through the first Cathode.

The electric field source arrangement may be formed by an Anode electrode (and possibly also a Gate electrode) associated with said first Cathode, and a voltage supply source, to thereby create an electric current from the first Cathode. It should be understood that for the purposes of the invention, the electric field is aimed at generating a change in the potential difference between two surfaces of the first Cathode either by inducing this voltage (a potential that is built to "block" the current or directly by an electric current flowing through the Cathode. In the case where the first Cathode is a Photocathode, the electric field source may include an illumination source operable to vary the intensity and/or wavelength of the input light.

The electric current from the first Cathode creates the potential difference between the opposite surfaces of the first Cathode. By changing this potential difference (e.g., by varying the voltage supply to the Anode or to the Gate; or by varying the input light onto the first Photocathode), the refractive index of the first Cathode is changed. For example, when electrons are ejected from the first Photocathode as a result of illumination and return to said Photocathode due to a repelling electrical field generated by the Anode or Gate, a potential difference is created between the two surfaces of the Photocathode.

According to another aspect of the invention, there is provided an electro-optical modulator device comprising: a first cathode exposed to input light; and an electric field source configured and operable to create a potential difference between two opposite surfaces of the first Cathode to thereby causing a change in the refractive index of the first Cathode by varying the electric field and accordingly causing a change in the propagation of light reflected from or transmitted through the first Cathode; and a second photocathode configured to be illuminated by the light from the first Cathode; the device thereby providing for affecting electrons' extraction from the second photocathode.

According to yet another aspect of the invention, there is provided an electro-optical modulator device comprising: a first Cathode for exposing to input light; and an electric field source configured and operable to control a potential difference between two opposite surfaces of the first Cathode thereby causing a change in a refractive index of the first Cathode by varying the electric field and accordingly causing a change in the propagation of a light reflected from or transmitted through the first Cathode.

According to yet another aspect of the invention, there is provided an electro-optical modulator device comprising: a first Cathode exposed to input light; and an electric field source configured and operable to create a potential difference between two opposite surfaces of the first Cathode thereby causing a change in a refractive index of the first Cathode by varying the electric field and accordingly causing a change in the propagation of a light reflected from or transmitted through the first Cathode; and a second Photocathode optically connectable to the first Cathode to be illuminated by said light from the first Cathode; the device thereby providing for affecting electrons' extraction from the second Photocathode.

According to yet another aspect of the invention, there is provided an electronic system comprising the above-described electro-optical modulator and an external light sensitive electronic device optically connectable to the first Cathode of the modulator, thereby allowing for selective fast switching of said external electronic device.

According to yet another aspect of the invention, there is provided an analog-to-digital converter device comprising: an electro-optical modulator device comprising a light modulator unit having a first Cathode for exposing to input light; and an electric field source configured to create an electric field affecting a change in the refractive index of the first Cathode, thereby effecting a change in the propagation of light reflected from or transmitted through the first Cathode; and an external light sensitive electronic device optically connectable to the first Cathode, said light from the first Cathode thus affecting the operation of said light sensitive electronic device, an electric output of said light sensitive electronic device being a digital representation of an analog input signal creating said electric field in the electro-optical light modulator.

According to yet another aspect of the invention, there is provided a method for light deflection, the method comprising affecting the refractive index of a Cathode by applying an electric field thereto while illuminating the Cathode, thereby affecting the propagation of light reflected from or transmitted through the Cathode.

According to yet another aspect of the invention, there is provided a method for controllably operating an electronic device configured as at least one diode or triode structure, the method comprising: providing a Photocathode in said at least one diode or triode structure; arranging said Photocathode to be optically connectable to an external Cathode; applying to said external Cathode, while being illuminated, an electric field affecting a change in the refractive index of said Cathode, thereby effecting a change in the propagation of light reflected from or transmitted through the Cathode, thus affecting electron emission from said Photocathode and thereby controlling the operation of said electronic device.

The present invention is described below as utilizing a Photocathode-based light modulator unit and is therefore described below with respect to this specific application. However, it should be understood that the present invention is not limited to this specific example.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE INVENTION

Figure 1:
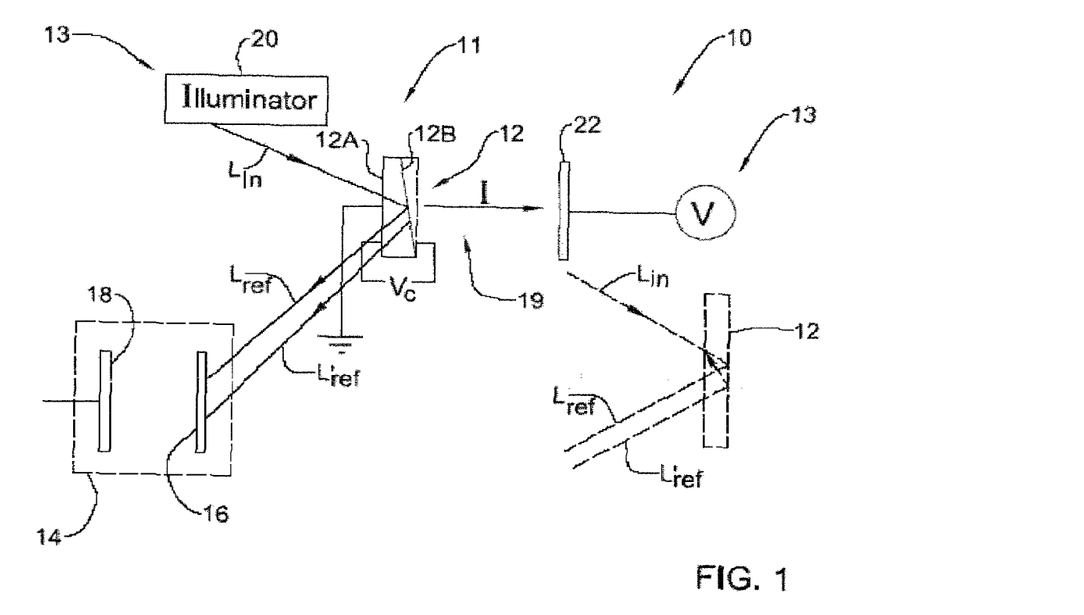
FIG. 1 is a schematic illustration of an example of electro-optical modulator of the present invention.

Referring to FIG. 1, there is schematically illustrated an example of a device 10 of the present invention configured as an electro-optical modulator. The device comprises a light modulator unit 11 including a first Cathode 12 exposed to input light $L_{in}$ coming from illuminator 20 (which may and may not be a constructional part of the light modulator unit), and an electric field source 13 configured and operable to create and vary a potential difference between opposite surfaces 12A and 12B of the Cathode 12. The electric field source 13 may be formed by an electronic (voltage) supply unit associated with an Anode 22 (or Gate as will be exemplified below).

In the present example, the Cathode 12 is configured as a Photocathode. It should be noted that in this case the electric field source 13 may be a control unit associated with the illuminator 20 (which acts as electrons' extractor from the Photocathode 12) and configured and operable for varying the intensity and/or wavelength of the input light. It should be noted, although not specifically shown that such a control unit 13 may operate a light source of the illuminator to appropriately tune the intensity and/or wavelength of emitted light, or may include an appropriate light modulator and/or filter accommodated in the optical path of light propagating towards the Photocathode.

In the present example, the light modulator unit 11 is associated with a light sensitive device 16, for example a second Photocathode which is associated with an anode 18 thus forming an electronic device 14. The arrangement is such that light returned from (reflection or transmission) the Cathode 12 (light reflected from the Cathode, in the present example) can illuminate the Photocathode 16 (which may for example be semi-transparent) to extract electrons from Photocathode 16. To this end, the Cathodes 12 and 16 may be accommodated such that Photocathode 16 is in the optical path of light reflected from Cathode 12; or Cathodes 12 and 16 may be optically connected by an optical fiber.

It should be noted that illuminator 20 may be constituted by an optical fiber associated with a remote signal source, for example for transmitting a light signal indicative of signal coming from a communication network. In the present example, the Photocathode 12 is arranged so as to be part of an electronic device 19 configured as a diode (or triode) formed by Photocathode 12 and Anode 22 (and possibly also a gate which is not shown here).

The Cathode 12 is made of a material whose refractive index is alterable by an electric field applied thereto. These are materials in which an electro-optical effect occurs, such as the Pockels effect occuring in crystals that lack inversion symmetry, such as lithium niobate or gallium arsenide, or the Kerr effect (also known as the quadratic electro-optic (QEO) effect) occurring in all materials.

As shown in the example of FIG. 1, Cathode 12 can have a taper-like configuration, or a planar configuration as shown in dashed lines.

As indicated above, the second Photocathode 16 is part of an electronic device 14 (e.g. diode or triode) and is thus associated with Anode 18 (and possibly also a Gate). The Photocathode 16 as well as its associated Anode 18 may be made of metal or semiconductor materials. The Photocathode 16 is preferably a reduced work function electrode. Negative electron affinity (NEA) materials can be used (e.g., diamond), thus reducing the photon energy (exciting energy) necessary to induce photoemission in the Photocathode 16. Another way to reduce the work function is by coating or doping the Photocathode 16 with an organic or inorganic material that reduces the work function. For example, this may be metal, multi-alkaline, bi-alkaline, or any NEA material, or GaAs electrode with cesium coating or doping thereby obtaining a work function of about 1-2 eV. The organic or inorganic coating also serves to protect the cathode electrode from contamination.

A gap between Photocathode 16 and Anode 18 may be vacuum gap; or may be a gas-medium gap (e.g., air) in which case the gas pressure in the gap is sufficiently low to ensure that a mean free path of electrons accelerating from the Photocathode 16 to the Anode 18 is larger than a distance between them (larger than the gap length). Accommodating the Photocathode 16 and Anode 18 with such an appropriate distance between them allows for eliminating the need for vacuum between them or at least significantly reducing the vacuum requirements. For example, for a 10 micron gap between Photocathode 16 and Anode 18, the gas pressure of a few mBar may be used.

The reflection or transmission of input light by the Cathode 12 is controlled by an electric field applied to the Cathode 12, which in the present example is achieved by voltage supply to Anode 22.

Light from Cathode 12 incident upon Photocathode 16 extracts electrons from Photocathode 16 thereby generating an electric current through the electronic device 14. Hence, by appropriately modulating the reflection/transmission properties of the Cathode 12, the operation of the electronic device 14 can be controlled. In the present example, light reflected from Cathode 12 is used, but the invention is not limited to reflection mode operation. Also the invention will be described below for the case where light modulator unit 11 utilizes Photocathode 12, but a "simple" Cathode 12 can be used as well.

The electro-optical modulator device 10 operates as follows: Input light $L_{in}$ (coming from the illuminator 20) illuminates the Photocathode 12. This light is partly absorbed by the Photocathode 12, partly transmitted (not shown), and partly reflected $L_{ref}$. The Photocathode 12 thus emits electrons. At appropriate Anode 22 voltage, electrons pass from the Photocathode 12 to the Anode 22, creating an electrical current, I.

It should be understood that such Anode current can be obtained at positive or even zero Anode voltage if there is no space charge between the Anode and Cathode (given that electrons are emitted with non-zero kinetic energy); so actually the Anode voltage should be negative enough to repel the electrons (equaling more or less the maximal initial kinetic energy $E_k$ of electrons, but with a negative sign). When an electrical current I exists, a potential difference $V_c$ is created between the two opposite surfaces 12A and 12B of the Photocathode layer 12. This potential difference $V_c$ is equal to IR, where R is the resistance of the Photocathode 12. Alternatively, when the Anode voltage is negative enough to repel the electrons back to the Photocathode, the induced voltage on the Photocathode $V_c$ is equal in magnitude to the Anode voltage.

The potential difference $V_c$ thus represents an electric field existing between the two edges of the Photocathode 12. Variation of this electric field causes a change in the refractive index of the Photocathode 12, which in turn, effects a change (depending on the geometry of the Photocathode 12) in the direction of propagation of reflected light, denoted $L'_{ref}$. In the case of the taper geometry of the Photocathode 12 (as shown in the figure), this results in reflection of the light at an angle different from the angle of incidence. As shown in the figure in dashed lines, in the case of planar Photocathode 12, a change in the refractive index of Photocathode results in a deflection (displacement) of the reflected light beam, but not in a change of the angle.

This deflection of the light beam can be used for many applications as will be exemplified below. Generally, controllably deflecting the light from the first Cathode 12 provides for controlling the operation of the electronic device 14.

It should be understood that a change of the refractive index of Photocathode 12, i.e., causing a change of $V_c$, e.g., by affecting an electric current between Cathode 12 and Anode 22, can be achieved by appropriately modulating the incident light $L_{in}$ (modulating the illuminator 20). In this case, the same illumination source can be used for both the creation of the Photocathode current and creation of the light beam that is to be deflected, or different illumination sources with possibly different wavelengths can be used. In particular, Photocathodes can be designed such that the wavelength that controls the current in the light modulator unit, is not detected by the second Photocathode 16 (having a different spectral response); this prevents the influence of unwanted reflections inside the entire device.

The illuminator 20 can include one or more light sources operable with a wavelength range including that of the exciting illumination for the Photocathode 16 used in the device. This may be, but is not limited to, a low pressure lamp (e.g., Hg lamp), other lamps (e.g. high pressure Xe lamp), a continuous wave (CW) laser or pulse laser (high frequency pulse), one or more non-linear crystals, or one or more light emitting diodes (LEDs), or any other light source or a combination of light sources. As indicated above, the illuminator may be constituted by an optical fiber transmitting a signal coming from e.g. a communication network.

Yet another way to vary the refractive index of Photocathode 12 and consequently the deflection of light (e.g., reflected light) is to vary the voltage supply to a Gate electrode of the electron device 19. This is exemplified in FIG. 2. To facilitate understanding, the same reference numbers are used for identifying components that are common in all the examples of the invention.

Figure 2:
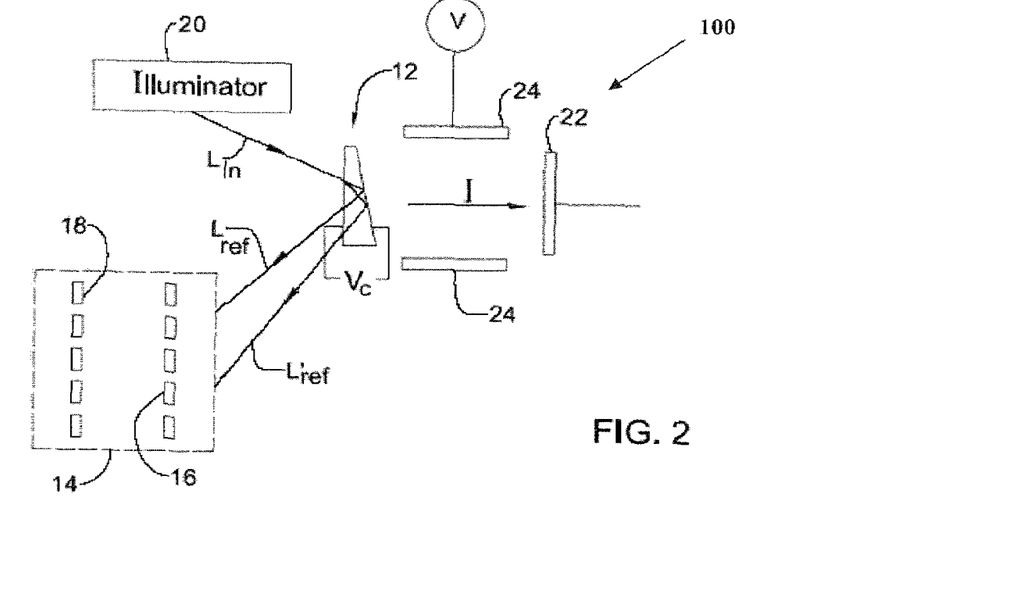
FIG. 2 is a schematic illustration of another example of electro-optical modulator of the present invention.

An electro-optical modulator device 100 of FIG. 2 includes a Photocathode 12, which in the present example has a taper-like configuration (but is should be understood that this is optional and is defined by a specific application of the device), and Photocathode 16, which are parts of electronic devices 19 and 14, respectively. The electronic device 14 may include a single diode/triode structure or an array of such structures, and accordingly Photocathode 16 may be a continuous Photocathode layer or may be a patterned layer defining an array of spaced-apart Photocathode elements 16.

An illuminator 20 operates as an electrons' extractor for the Photocathode 12. The operation of the Photocathode 12 (i.e., variation of its refractive index) is controlled by the Gate 24, namely variation of the Gate 24 voltage effects an electric current from Photocathode 12 to Anode 20 and thus effects a potential difference $V_c$ between the opposite edges 12A and 12B of the Photocathode 12. Thus, the light from illuminator 20 can reach any of the array units of electronic device 14, at choice, by controlling $V_c$.

The present invention provides for very fast signal modulation using low values of the control voltage (anode voltage or gate voltage).

Figure 3A:
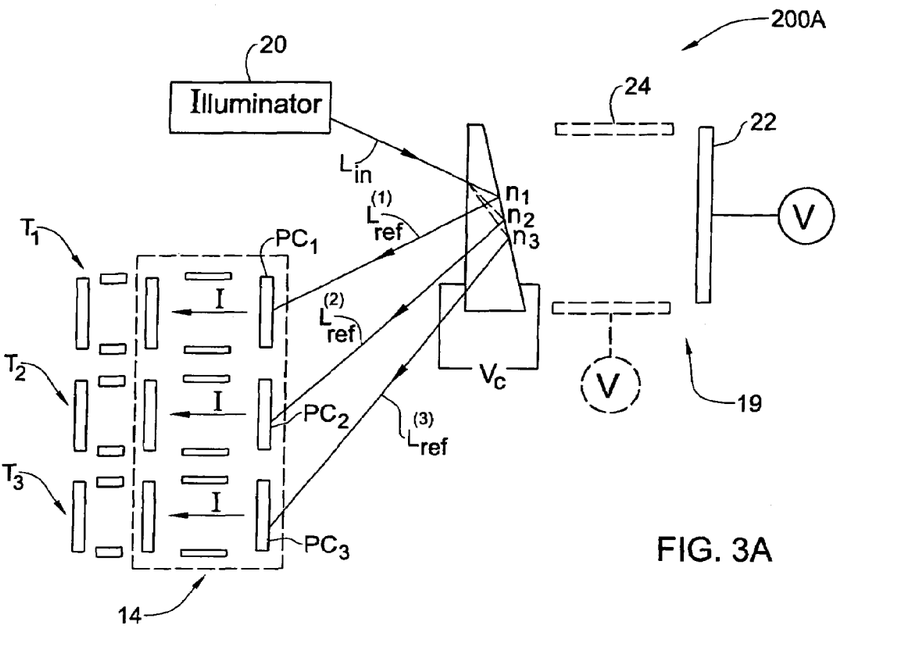
FIGS. 3A and 3B exemplify the use of the device of the present invention for controllably addressing a selective transistor in an electronic system.
Figure 3B:
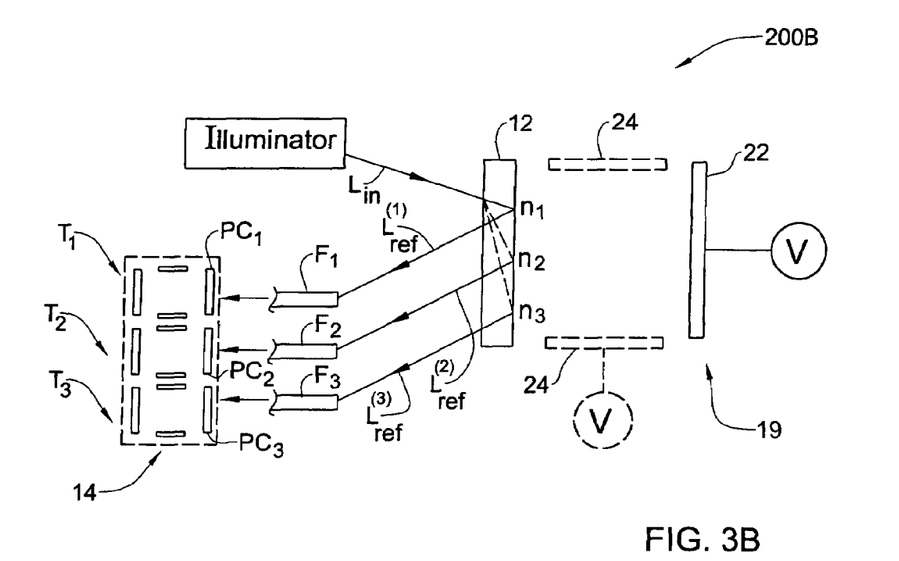

Reference is made to FIGS. 3A and 3B showing two specific but not limiting examples of use of the technique of the present invention.

In the example of FIG. 3A, an electronic system 200A is illustrated configured to selectively address an electronic device (referred to henceforth as a "transistor", although this does not imply any particular transistor architecture, such as CMOS) from an array of N electronic devices—three such transistors $T_1$-$T_3$ being shown in the present example (which may or may not include Photocathodes). The system 200A utilizes an electro-optical modulator device 100 of the present invention, including a Photocathode 12 being a part of an electronic device 19, and an array of Photocathodes being part of array of diode/triode structure of an electronic device 14 (Photocathodes $PC_1$-$PC_3$ of three diodes/triodes in the present example). The electronic device 14 is associated with transistors $T_1$-$T_3$. The Photocathode 12 is operated by incident light from an illuminator 20 resulting in electron emission from the Photocathode 12.

Variation of the refractive index of the Photocathode 12 is controlled by the Anode 22 (or by Gate 24 as shown in the figure in dashed curves) or by the illumination, as described above. As shown, different refractive indices $n_1$-$n_3$ of the Photocathode 12 result in different reflected light beams $L^{(1)}_{ref}$-$L^{(3)}_{ref}$, respectively, thus addressing different transistors $T_1$-$T_3$ via different Photocathodes $PC_1$-$PC_3$.

In the example of FIG. 3A, Photocathode 12 has a taper-like configuration, and accordingly the redirection of reflected light is a result of a change of the reflection angle. FIG. 3B shows a device 200B configured to provide a similar effect (deflection of reflected light) obtained with a planar configuration of Photocathode 12. Here, different refraction indices $n_1$-$n_3$ of the Photocathode 12 (obtained by varying Anode 22 voltage or Gate 24 voltage or illumination $L_{in}$) provide three spaced-apart parallel reflected light beams $L^{(1)}_{ref}$-$L^{(3)}_{ref}$, respectively, propagating to Photocathodes $PC_1$-$PC_3$ via optical fibers $F_1$-$F_3$, respectively. Thus, by varying the refractive index of Photocathode 12 (via $V_c$ variation), different transistors $T_1$-$T_3$ can be selectively addressed through different Photocathodes $PC_1$-$PC_3$ of the multiple-diode/triode electronic device 14.

Thus, the present invention provides very fast signal switching. Moreover, Photocathode 16 can be increased in its area to generate a higher power increasing the capacitance only slightly (as the distance between the Photocathode and the Anode can be augmented to compensate for any rise in capacitance). The present invention also advantageously provides for using the same light modulating arrangement (electronic device 19 including Photocathode 12) for all the structures (with Gates or gateless) of the electronic device 14.

Figure 3C:
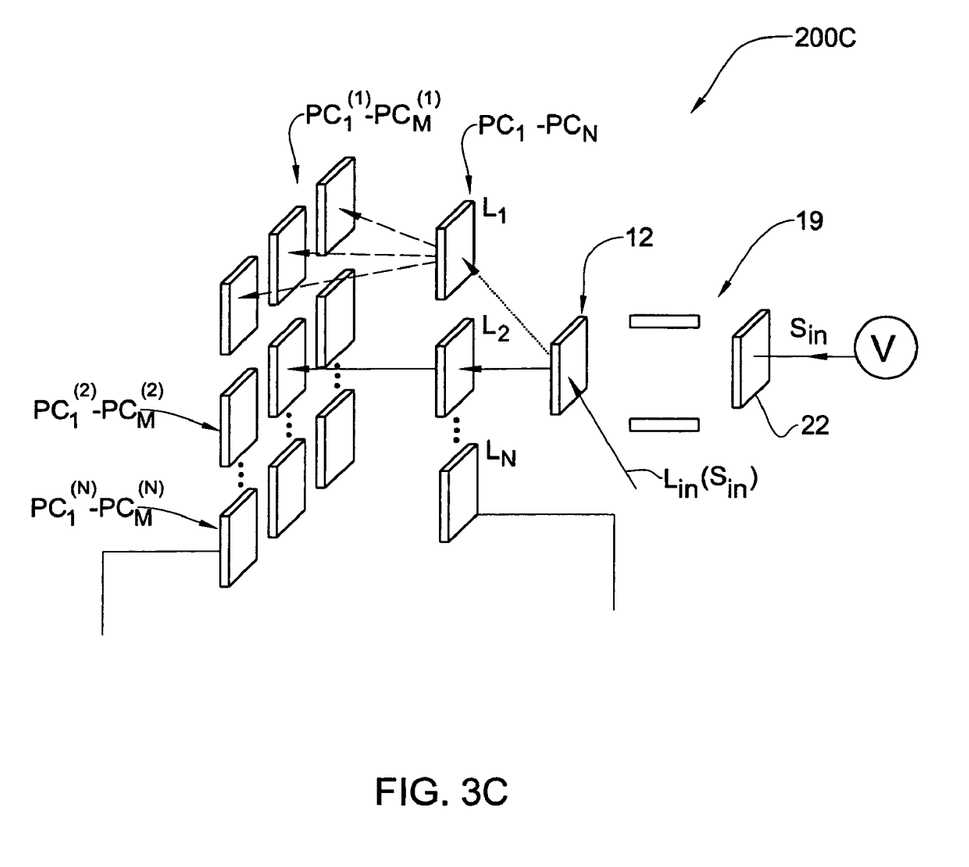
FIG. 3C exemplifies the device configuration operable as an analog-to-digital (A2D) converter.

Moreover, a device of the present invention, such as that exemplified in FIGS. 3A and 3B, can function not only as a switching device, but also as an analog-to-digital converter. This is exemplified in FIG. 3C showing an A2D converter 200C including a light modulator unit (electronic device) 19 (which may include Gate or be gateless), and is associated with an external system 14 including a second Photocathode 16 which is configured to define a collection (e.g. array or matrix) of N Photocathode elements $PC_1$-$PC_N$ arranged in a spaced-apart relationship at locations $L_1$-$L_N$, respectively. An analog input signal $S_{in}$ (which creates the electric field affecting the refractive index of Cathode 12, and may thus be an electric field or a light signal) effects the deflection of light towards a particular (i.e. one or more) of the Photocathode elements $PC_1$-$PC_N$, which consequently emits current. The location of the emitted current therefore represents the same information as does the input signal.

The resolution of such an analog-to-digital (A2D) converter is limited by the possible angle at which the light beam can be deflected, by the cross-sectional dimensions of the beam, and by the dimensions and sensitivity of the target Photocathodes. The resolution can be increased by using multiple layers of Photocathodes. For example, as shown in the figure, Photocathode 16 is formed by N Photocathode elements $PC_1$-$PC_N$ arranged in a "row" and M×N Photocathode elements arranged in "columns" $PC^{(1)}_1$-$PC^{(1)}_M$, $PC^{(2)}_1$-$PC^{(2)}_M$, ..., $PC^{(N)}_1$-$PC^{(N)}_M$. A primary Photocathode (first Cathode) 12 deflects light to one of an array ("row") of secondary Photocathode elements $PC_1$-$PC_N$ thus activating that Photocathode element. When the particular secondary Photocathode element in the row is activated, it emits electrons and also suitably deflects the incident light (transmits light in the present example) to the Photocathode element from its associated "column", column $PC^{(1)}_1$-$PC^{(1)}_M$ in the illustrated example. Thus, a two-dimensional representation (in the logical sense, not necessarily in the spatial configuration of the electrodes) is obtained.

Additionally, the technique of the present invention can be used in optical communications, for transferring information within a computer (bus) or "on board" interconnect. This solves the problem of slow metal interconnects or optical interconnects that cannot exceed 5 GHz.

Figure 4A:
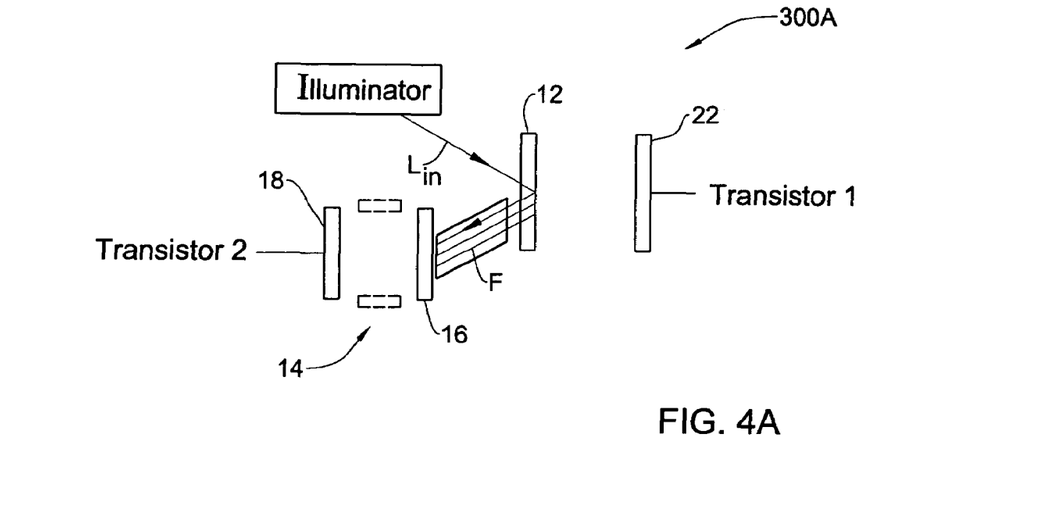
FIGS. 4A and 4B exemplify the use of the device of the present invention for controllably connecting two transistors of an electronic system.

FIG. 4A illustrates a part of multiple-transistor electronic system—two such transistors $T_1$ and $T_2$ being shown in the present example, which may and may not be photocathode-based transistors. The electronic system utilizes an electro-optical modulator device 300A of the present invention configured and operable to perform electrical connection between transistors $T_1$ and $T_2$ using an optical signal thereby effecting a very fast signal connection. The device 300A includes a Photocathode 12 associated with Anode 22 of transistor $T_1$ (i.e., Photocathode 12 is "connected" to output of transistor $T_1$), and an electronic device (diode/triode) 14 including Photocathode 16 associated with Anode 18 of transistor $T_2$ (i.e., photocathode 16 is "connected" to input of transistor $T_2$). An illuminator 20 operates to extract electrons from Photocathode 12. Operating the electric current from Photocathode 12 to Anode 22 (by the Anode 22 voltage of transistor $T_1$) affects light reflection from Photocathode 12, which in turn affects voltage supply to anode 18 of transistor $T_2$. The configuration is such that irrespective of a change in the refractive index of Photocathode 12, light reflected therefrom is directed by an optical fiber F to Photocathode 16.

Figure 4B:
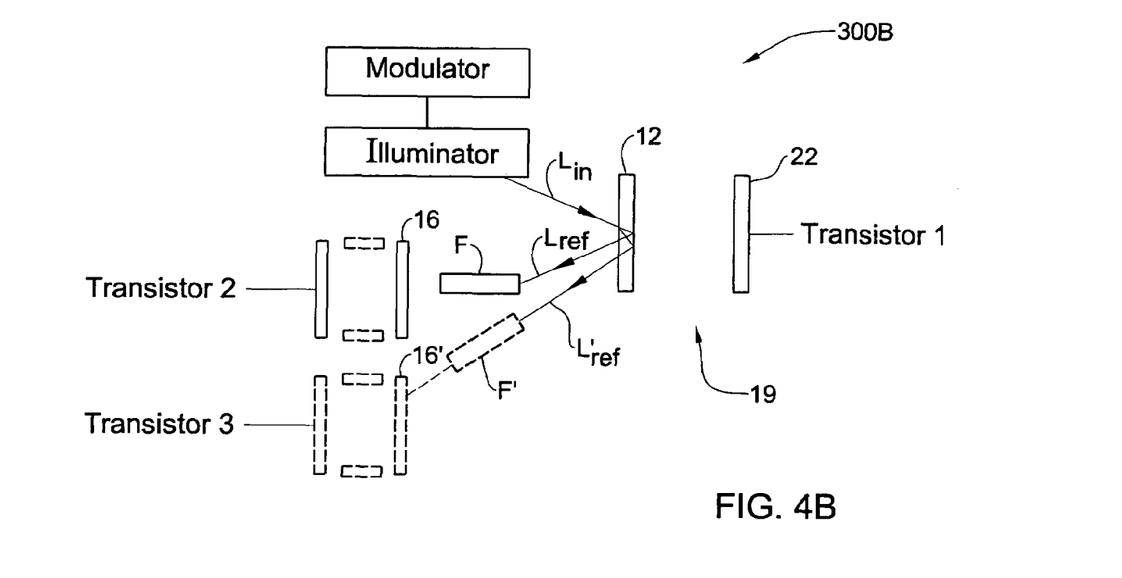

FIG. 4B exemplifies the use of the electro-optical modulator of the present invention for selectively performing electrical connection between transistors $T_1$ and $T_2$ (or as shown in the figure in dashed lines selectively connect transistor $T_1$ to either one of transistors $T_2$ and $T_3$). The electro-optical modulator 300B includes a Photocathode 12 "connected" to output of transistor $T_1$; a Photocathode 16 "connected" to input of transistor $T_2$ (via an electronic device that may or may not utilize a gate); and an illuminator 20. Optionally, as shown in dashed lines, Photocathode 16' is provided being "connected" to input of transistor $T_3$.

In this example, the electrical connection between transistors $T_1$ and $T_2$ is selectively created (or selective connection of transistor $T_1$ to transistor $T_2$ or $T_3$ is provided) by changing the intensity of light $L_{in}$ incident onto the Photocathode 12 (to thereby affect $V_c$ as described above), achieved by appropriately modulating the illuminator 20 operation. As shown in the figure, propagation of reflected light beams $L_{ref}$ and $L'_{ref}$ corresponding to refractive indices $n_1$ and $n_2$ of Photocathode 12, results in that the reflected light beams, respectively, pass through an optical fiber F thus affecting the transistor $T_2$ operation, and propagates outside the fiber (or pass through another fiber F' thus affecting the transistor $T_3$ operation).

Those skilled in the art will readily appreciate that various modifications and changes can applied to the embodiments of the invention as hereinbefore described without departing from the scope of the invention. The first Cathode may and may not be a Photocathode. The first Cathode may have a taper-like geometry thus allowing for affecting an angle of propagation of the returned light; or may have planar geometry thus allowing for displacing in a parallel fashion the axis of propagation of the returned light.

The invention claimed is:

1. An electro-optical modulator device comprising:
   a light modulator unit having a first Cathode for exposing to input light; and
   an electric field source configured and operable to create a change in a potential difference between two opposite surfaces of the first Cathode
   to create an electric field effecting a change in the refractive index of the first Cathode, thereby effecting a change in the propagation of light reflected from or transmitted through the first Cathode,
   thus enabling to affect the operation for an external light sensitive electrode device.

2. The device of claim 1, comprising an illumination source configured for applying the input light to the first Cathode.

3. The device of claim 1, wherein said electric field source is a source of electric current from the first Cathode.

4. The device of claim 1, comprising a first Anode forming with said first Cathode a diode structure.

5. The device of claim 4, wherein said first Cathode is configured as Photocathode, said electric field source being configured and operable to controllably vary a potential difference between the opposite surfaces of the first Photocathode by varying a voltage supply on the first Anode thereby varying the electric current through the light modulator unit.

6. The device of claim 4, wherein said first Cathode is configured as Photocathode, said electric field source being configured and operable to controllably vary the first Anode voltage thereby changing a potential induced on the first Photocathode.

7. The device of claim 4, wherein said first Cathode is configured is Photocathode, said electric field source being configured and operable to controllably vary a potential difference between the opposite surfaces of the first Photocathode by varying at least one of intensity and wavelength of the input light.

8. The device of claim 4, wherein the first Cathode and the first Anode are at a tunneling distance between them, an electric current from the first Cathode to the first Anode generating the electric field between the two surfaces of the Cathode.

9. The device claim 4, wherein said first Anode is an electrode of an additional electronic device associated with said light modulator unit.

10. The device of claim 1, comprising a first Anode and a first Gate which form with said first Cathode a triode structure.

11. The device of claim 10, wherein said first Cathode is configured as Photocathode, said electric field source being configured and operable to controllably vary a potential difference between the opposite surfaces of the first Photocathode by varying a voltage supply on at least one of the first Anode and first Gate, thereby varying the electric current through the light modulator unit.

12. The device of claim 10, wherein said first Cathode is configured as Photocathode, said electric field source being configured and operable to controllably vary voltage on at least one of the first Anode and first Gate thereby changing a potential induced on the first Photocathode.

13. The device of claim 10, wherein said first Cathode is configured as Photocathode, said electric field source being configured and operable to controllably vary a potential difference between the opposite surfaces of the first Photocathode by varying at least one of intensity and wavelength of the input light.

14. The device of claim 10, wherein the first Cathode and the first Anode are at a tunneling distance between them, an electric current from the first Cathode to the first Anode generating the electric field between the two surfaces of the Cathode.

15. The device claim 10, wherein said first Anode is an electrode of an additional electronic device associated with said light modulator unit.

16. The device of claim 1, wherein said first Cathode is configured as Photocathode.

17. The device of claim 16, wherein said electric field source being configured and operable to controllably vary a potential difference between the opposite surfaces of the first Photocathode by varying at least one of intensity of wavelength of the input light.

18. The device of claim 1, comprising an external light sensitive electronic device, which comprises at least one diode or triode unit including a second Photocathode optically connectable to the first Cathode to allow incidence of light from the first Cathode onto the second Photocathode, thereby affecting the operation of said external electronic device.

19. The device of claim 18, wherein the first Cathode and the second Photocathode are arranged such as to allow incidence of the light reflected from the first Cathode onto the second Photocathode.

20. The device of claim 18, wherein the first Cathode and the second Photocathode are arranged such as to allow incidence of the light transmitted through the first Cathode onto the second Photocathode.

21. The device of claim 18, wherein said external electronic device comprises at least a second Anode associated with said second Photocathode, an electric current between the second Photocathode and its associated second Anode being affected by electrons emitted from the second Photocathode in response to said light from the first Cathode, the electric current through the external electronic device thus depending on the light output of the light modulator unit.

22. The device of claim 18, wherein said second Photocathode is configured as an array of at least two spaced-apart electrode-elements each associated with its respective second Anode element, thus defining an array of at least two diode or triode structures, respectively.

23. The device of claim 22, configured and operable as an analog-to-digital converter, an analog input signal creating said electric field effecting the deflection of the light response towards at least one selected electrode-element to cause the current therefrom, a location of the emitted current being therefore indicative of information carried in the input signal.

24. The device of claim 23, wherein the second Photocathode is configured as an array of more than two second electrode elements, and the more than two second electrode elements being arranged in a two-dimensional array of rows and columns the first Cathode deflecting light to one of the second electrode elements in the row, which responds by emitting electrons and by appropriately deflecting the incident light to a second electrode element in the associated column, the device thereby providing two-dimensional digital representation of the input analog signal.

25. The device of claim 22, configured for sequentially or concurrently illuminating the electrode-elements by the light response of the first cathode.

26. The device of claim 1, configured and operable as an analog-to-digital converter, an analog input signal creating said electric field effecting deflection of the light reflected from or transmitted through the first Cathode towards the light sensitive electrode device, thereby providing a digital representation of the analog input signal at the output of the light sensitive electrode device.

27. The device of claim 1, configured and operable for connecting at least one electronic device, having a light sensitive element optically connectable to said first Cathode, to at least another electronic device having an Anode electrode associated with said first Cathode to enable electric current from the first Cathode to said Anode electrode, the device being thereby configured and operable to control the operation of said light sensitive element and thus the operation of said at least one electronic device in accordance with a signal coming from said at least another electronic device, allowing for signal switching or attenuation functions.

28. The device of claim 27, wherein said light sensitive element is a Photocathode or optocoupler.

29. An electronic system comprising the electro-optical modulator device of claim 1 and an external light sensitive electronic device optically connectable to the first Cathode of the modulator device, thereby allowing for selective fast switching of said external electronic device.

30. An electro-optical modulator device comprising:
a first Cathode exposed to input light; and an electric field source configured and operable to create a potential difference between two opposite surfaces of the first Cathode to thereby enable to cause a change in a refractive index of the first Cathode by varying an electric field and accordingly cause a change in the propagation of light reflected from or transmitted through the first Cathode; and
a second Photocathode optically connectable to the first Cathode to be illuminated by said light from the first Cathode;
the device thereby providing for effecting electron emission from the second Photocathode.

31. An analog-to-digital converter device comprising: an electro-optical modulator device comprising a light modulator unit having a first Cathode for exposing to input light; and an electric field source configured to create an electric field affecting a change in the refractive index of the first Cathode, thereby effecting a change in the propagation of light reflected from or transmitted through the first Cathode; and an external light sensitive electronic device optically connectable to the first Cathode, said light from the first Cathode thus affecting the operation of said light sensitive electronic device, and electric output of said light sensitive electronic device being digital representation of an analog input signal creating said electric field in the electro-optical light modulator.

32. A method for controllably operating an electronic device configured as at least one diode or triode structure, the method comprising: providing a Photocathode in said at least one diode or triode structure; arranging said Photocathode to be optically connectable to an external Cathode; applying to said external Cathode, while being illuminated, an electric field affecting a change in the refractive index of said Cathode, thereby effecting a change in the propagation of light reflected from or transmitted through the Cathode, thus affecting electron emission from said Photocathode thereby controlling operation of said electronic device.

33. An electro-optical modulator device comprising:
a light modulator unit having a first Cathode for exposing to input light;
an electric field source configured to create an electric field effecting a change in light refractive index of the first Cathode, thereby effecting a change in a propagation of light reflected from or transmitted through the first Cathode, thus enabling to affect the operation of an external light sensitive electronic device; and
an external light sensitive electronic device, which comprises at least one diode or triode unit including a second Photocathode optically connectable to the first Cathode to allow incidence of light from the first Cathode onto the second Photocathode, thereby affecting the operation of said external electronic device.

34. The device of claim 33, wherein said electric field source is configured and operable to create a change in a potential difference between two opposite surfaces of the first Cathode to thereby cause said change in the refractive index of the first Cathode.

35. An electro-optical modulator device comprising:
a light modulator unit having a first Cathode for exposing to input light; and
an electric field source configured to crate an electric field effecting a change in the refractive index of the first Cathode, thereby effecting a change in the propagation of light reflected from or transmitted through the first Cathode, thus enabling to affect the operation of an external light sensitive electronic device; the device being configured and operable for connecting at least one electronic device, having a light sensitive element optically connectable to said first Cathode, to at least another electronic device having an Anode electrode associated with said first Cathode to enable electric current from the first Cathode to said Anode electrode,
the device being thereby configured and operable to control the operation of said light sensitive element and thus the operation of said at least one electronic device in accordance with a signal coming from said at least another electronic device, allowing for signal switching or attenuation functions.

36. An electronic system comprising:
an electro-optical modulator device comprising a light modulator unit having a first Cathode for exposing to input light; and an electric field source configured to create an electric field effecting a change in the refractive index of the first Cathode, thereby effecting a change in the propagating of light reflected from or transmitted through the first Cathode, thus enabling to affect the operation of an external light sensitive electronic device; and
an external light sensitive electronic device optically connectable to said first Cathode of the electro-optical modulator device, thereby allowing for selective fast switching of the external electronic device.

* * * * *